United States Patent [19]

Umetani et al.

[11] Patent Number: 5,304,612

[45] Date of Patent: Apr. 19, 1994

[54] PLURAL LIQUID PACK TYPE HEAT CURABLE POLYISOCYANATE-GLYCIDYL ACRYLATE COMPOUND RESINOUS COMPOSITION AND PROCESS FOR PRODUCING SHAPED RESIN ARTICLE THEREFROM

[75] Inventors: Hiroyuki Umetani; Takeyoshi Yamada, both of Iwakuni, Japan

[73] Assignee: Teijin Limited, Osaka, Japan

[21] Appl. No.: 812,058

[22] Filed: Dec. 17, 1991

[30] Foreign Application Priority Data

Dec. 25, 1990 [JP] Japan .................................. 2-412881
Mar. 20, 1991 [JP] Japan .................................. 3-80374
Apr. 30, 1991 [JP] Japan .................................. 3-124417

[51] Int. Cl.$^5$ .......................................... C08F 283/00
[52] U.S. Cl. ................................ 525/528; 525/452; 525/453; 528/48; 528/59; 528/73; 528/93; 528/103
[58] Field of Search .................. 525/528, 452, 453; 528/48, 93, 103, 59, 73

[56] References Cited

U.S. PATENT DOCUMENTS

| | | | |
|---|---|---|---|
| 3,979,406 | 9/1976 | D'Alelio | 526/260 |
| 4,022,721 | 5/1977 | Ashida | 521/119 |
| 4,415,469 | 11/1983 | Tsai | 525/528 |
| 4,424,316 | 1/1984 | DiSalvo et al. | 525/528 |
| 4,542,165 | 9/1985 | Kumata et al. | 521/137 |
| 4,552,943 | 11/1985 | O'Connor et al. | 528/50 |
| 4,605,711 | 8/1986 | DiSalvo et al. | 515/530 |
| 4,658,007 | 4/1987 | Marks et al. | 528/55 |
| 4,766,158 | 8/1988 | Fuzesi et al. | 521/110 |
| 4,925,881 | 5/1990 | Udding et al. | 521/129 |
| 5,138,016 | 8/1992 | Murdock et al. | 525/452 |

FOREIGN PATENT DOCUMENTS

| | | |
|---|---|---|
| 0001165 | 3/1979 | European Pat. Off. . |
| 0133908 | 3/1985 | European Pat. Off. . |
| 444956A2 | 4/1991 | European Pat. Off. . |
| 203055 | of 0000 | Fed. Rep. of Germany . |
| 53-31515 | 9/1978 | Japan . |
| 62-62879 | 3/1987 | Japan . |
| 1104394 | 2/1968 | United Kingdom . |

OTHER PUBLICATIONS

Derwent Abstract, JP-B-78-31 515, Sekisui Chemical K.K.
Patent Abstracts of Japan, 62-62879, Denki Kagaku Kogyo K.K., Mar. 19, 1987.

*Primary Examiner*—Melvin I. Marquis
*Assistant Examiner*—Randy Gulakowski
*Attorney, Agent, or Firm*—Burgess, Ryan & Wayne

[57] ABSTRACT

A plural liquid pack type heat curable resin compound useful for producing a shaped resin article having an enhanced resistance to heat and chemicals, and excellent mechanical and electrical properties, comprises a first individual liquid component (A) comprising a polyisocyanate compound (a) and a second individual liquid component (B) comprising a glycidyl acrylate compound (b) having

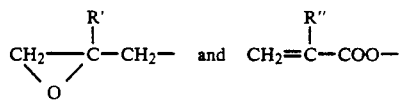

groups in which R' and R" respectively and independently represent a —H or —CH$_3$, a cyclization catalyst (c) and optionally at least one of polyol compounds (e) and polyepoxy compounds (f), the first and/or second individual liquid components (A) and/or (B) comprising a radical curing catalyst (d).

4 Claims, No Drawings

– 1 –

PLURAL LIQUID PACK TYPE HEAT CURABLE POLYISOCYANATE-GLYCIDYL ACRYLATE COMPOUND RESINOUS COMPOSITION AND PROCESS FOR PRODUCING SHAPED RESIN ARTICLE THEREFROM

BACKGROUND OF THE INVENTION

1) Field of the Invention

The present invention relates to a plural liquid pack-type heat curable polyisocyanate-glycidyl acrylate compound resinous composition, and a process for producing a shaped resin article therefrom. More particularly, the present invention relates to a plural liquid pack type heat curable polyisocyanate-glycidyl acrylate compound resinous composition having a low viscosity, curable at a relatively low temperature having an excellent storage stability, handling property and moldability, and useful for producing a shaped resin article having a superior heat resistance, chemical resistance, and mechanical strength, and a process for producing a shaped resin article therefrom with a high reproducibility and stability.

2) Description of the Related Art

Due to recent technological developments, various new types of resinous materials having an excellent heat resistance, mechanical properties, and moldability are now in demand.

Among these new resinous materials, the most noticeable is a reaction-molding type resin comprising a reactive monomer or oligomer. This reaction-molding type resinous material refers to a heat-curable resinous material having a relatively low viscosity, preferably being in the state of a liquid at room temperature, and capable of being simultaneously molded and cured (hardened or polymerized).

The heat curable resinous materials include polyurethane resins, epoxy resins, unsaturated polyester resins, polyvinylester resins and polydicyclopentadiene reins. Some of the above-mentioned resinous materials already have been commercially produced and marketed.

Nevertheless, these conventional heat-curable resinous materials are advantageous from the standpoint of some properties thereof, but disadvantageous from the viewpoint of other properties thereof. For example, the conventional polyurethane resins usually have a low heat resistance and the conventional unsaturated polyester resins and epoxy resins are too hard and fragile, and exhibit an unsatisfactory reactivity, although they have a higher heat resistance than that of the conventional polyurethane resins.

British Patent No. 1,104,394 discloses an improvement in the heat resistance of the conventional polyurethane resins, obtained by introducing an isocyanurate ring structure derived from a trimerization of an isocyanate compound thereinto. This improvement has long been known and practiced in the polyurethane resin industry, but is effective only for increasing a heat-distortion temperature of a heat-cured polyurethane resin by about 20° C. to 30° C., and thus the resultant heat-cured polyurethane resin exhibits a heat-distortion temperature of not higher than about 150° C. to about 160° C. Also, the viscosity of this type of polyurethane resin is not always satisfactorily low.

A well known heat-curable resin produced by using, as a component, a polyisocyanate compound, is a heat curable resin having an oxazolidone ring structure derived from a reaction of an isocyanate group in a polyisocyanate compound with an epoxy group in an epoxy compound.

As a recent development, Japanese Unexamined Patent Publication No. 62-6879 disclosed a heat curable resin having the isocyanurate ring structure derived from a trimerization of an isocyanate compound together with the above-mentioned oxazolidone ring structure.

This heat curable resin is advantageous in having an enhanced heat resistance, but is disadvantageous in that the viscosity and reaction temperature of the resin are not satisfactorily low, and the handling property and moldability of the resin are unsatisfactory due to the use of the epoxy compound.

Also, Japanese Examined Patent Publication No. 53-31,515 discloses a process for producing a polymerizable resin by reacting a polyisocyanate compound with an acrylic acid ester compound or α-alkylacrylic acid ester compound having an epoxy group. In this process, in a first step, the isocyanate groups of the polyisocyanate compound are reacted with the epoxy group of the acrylic or α-alkylacrylic ester compound, to provide a polymerizable resin having an oxazolidone ring structure, and in a second step, to the resultant reaction mixture is added a radical curing catalyst, to cause a polymerization of the remaining vinyl groups of the acrylic or α-alkylacrylic acid ester compound. Therefore, the resultant heat curable resin exhibits a high viscosity, and thus is not suitable for a reaction molding process.

Further, Japanese Examined Patent Publication No. 53-31515 does not give a general description of a proportion in amount of the polyisocyanate compound to the acrylic or α-alkylacrylic acid ester compound having an epoxy group, but merely discloses, in an example thereof, that the isocyanate group and the epoxy group are present in a proportion in an equivalent of 1:1.

SUMMARY OF THE INVENTION

An object of the present invention is to provide a plural liquid pack-type heat curable polyisocyanate-glycidyl acrylate compound resinous composition having a low viscosity and an enhanced handling property and reactivity and capable of forming a shaped resin article having an excellent heat resistance, chemical resistance and mechanical strength, and a process for producing a shaped resin article therefrom with a high reproducibility and stability.

The above-mentioned object can be attained by the plural liquid pack type heat curable polyisocyanate-glycidyl acrylate compound resin composition of the present invention, and the process of the present invention for producing a shaped resin article from the above-mentioned resin composition.

The plural liquid pack type heat curable polyisocyanate-glycidyl acrylate compound resinous composition of the present invention comprises:

(A) a first individual liquid component comprising (a) at least one polyisocyanate compound having at least two isocyanate groups; and (B) a second individual liquid component comprising (b) at least one glycidyl acrylate compound having a group of the formula:

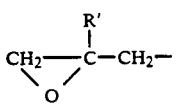

and a group of the formula:

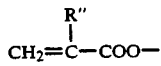

in which formulae, R' and R" respectively and independently represent a member selected from the group consisting of a hydrogen atom and a methyl group, and (c) a cyclization catalyst, at least one of first and second individual liquid components (A) and (B) containing (d) a radical catalyst.

In the above-mentioned resinous composition, the second individual liquid component (B) optionally comprises at least one member selected from the group consisting of (e) polyol compound having at least two hydroxyl groups and (f) polyepoxy compound having at least two epoxy groups.

Also, the second individual liquid component (B) is optionally composed of (i) an individual sub-component containing the glycidyl acrylate compound (b) and (ii) an individual sub-component comprising the cyclization catalyst (c).

At least one of the individual sub-components (i) and (ii) optionally further comprises the polyol compound (e).

Also, the individual sub-component (i) optionally further comprises the polyepoxy compound (f).

The process of the present invention for producing a shaped resin article from the above-mentioned plural liquid pack type heat curable polyisocyanate-glycidyl acrylate compound resin composition comprises the step of:

mixing the first individual liquid component (A) with the second individual liquid component (B) to provide a liquid resinous mixture;

immediately feeding the liquid resinous mixture into a mold;

heat-curing the liquid resinous mixture in the mold; and taking the resultant shaped resin article out of the mold.

In the process of the present invention, the liquid resinous mixture is optionally prepared by mixing the first individual liquid component (A) with the individual sub-components (i) and (ii) of the second individual liquid component (B).

DESCRIPTION OF THE PREFERRED EMBODIMENTS

The resinous composition of the present invention comprises a first individual component (A) and a second individual liquid component (B), packed separately from each other.

The first individual component (A) comprises at least one polyisocyanate compound (a) having two or more isocyanate groups.

The polyisocyanate compound (a) usable for the present invention is preferably selected from the group consisting of aliphatic polyisocyanate compounds, for example, hexamethylene diisocyanate, and 2,2,4- and 2,4,4-trimethylhexamethylene-1,6-diisocyanates; cycloaliphatic polyisocyanate compounds, for example, isophorone-diisocyanate, 4,4'-dicyclohexylmethane diisocyanate, and hydrogenated meta- and para-xylylene diisocyanates; aromatic polyisocyanate compounds, for example, 2,4- and 2,6-tolylene diisocyanates, 4,4'-diphenylmethane diisocyanate, 3,4'- and 4,4'-diphenylether diisocyanates, 1,5-naphthalene diisocyanate, meta- and para-xylylene diisocyanates, and polyphenylenepolymethylene polyisocyanates; modified polyisocyanate compounds, for example, carbodiimide-modified and polyol-modified 4,4'-diphenylmethane diisocyanates; and trimerized polyisocyanate compounds, having at least one isocyanate ring structure, for example, terpolymer of tolylene diisocyanate.

The first individual liquid component A comprises one or two or more polyisocyanate compounds. The most preferable polyisocyanate compounds are carbodiimide-modified and polyol-modified 4,4'-diphenylmethane diisocyanates, polyphenylenepolymethylenepolyisocyanates and 2,4- and 2,6-tolylenediisocyanates which are in the state of a liquid having a low viscosity of about 25 poises or less at room temperature.

The second individual liquid component (B) comprises at least one glycidyl acrylate compound (b) having a group of the formula:

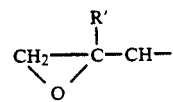

and a group of the formula:

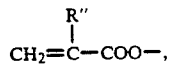

in which formulae, R' and R" respectively and independently represent a member selected from the group consisting of a hydrogen atom and a methyl group, and a cyclization catalyst (c).

The glycidyl acrylate compound (b) usable for the present invention is preferably selected from the group consisting of glycidyl acrylate, glycidyl methacrylate, β-methylglycidyl acrylate and β-methylglycidyl methacrylate. These glycidyl acrylate compounds (b) may be employed alone or as a mixture of two or more thereof.

In the resinous composition, the polyisocyanate compound (a) and the glycidyl acrylate compound (b) are preferably present in a proportion such that the isocyanate groups of the polyisocyanate compound (a) in the first individual liquid component (A) are in an amount of 120 to 1000 equivalents, more preferably 150 to 900 equivalents, still more preferably 160 to 800 equivalents, per 100 equivalents of the epoxy groups of the glycidyl acrylate compound (b) in the second individual liquid component (B).

In the second individual liquid component (B), the cyclization catalyst (c) preferably comprises at least one compound catalytically capable of promoting a cyclization-trimerization (tri-cyclization) reaction of an isocyanate compound to produce a isocyananurate ring structure or a reaction of an isocyanate compound with an epoxy compound, to produce a polyoxazolidone ring structure. Preferably, the cyclization catalyst (c) comprises at least one member selected from the group consisting of tertiary amine compounds, imidazole compounds, morpholine compounds, hexahydro-s-triazine compounds, diazabicyclo compounds and quaternary ammonium salt compounds.

The tertiary amine compound include, for example, triethylamine, benzyldimethylamine, N,N-dimethylaniline, N,N-dimethyl-p-toluidine, N,N'-dimethylpiperazine, N-glycydyl-N,N-dimethylamine, 2,4,6-tris(dimethylaminomethyl) phenol, pyridine, N,N,N',N'-tetraglycidylmethylene-dianiline, 1-(N,N-diglycidylamino)-4-glycidyloxybenzene, N,N,N',N'-tetraglycidyl-m-xylylenediamine and N,N,N',N'-tetraglycidyl-p-xylylenediamine. The imidazole compounds include, for example, imidazole, 2-methylimidazole, 2-ethyl-4-methylimidazole, and 1-cyanoethyl-2-ethyl-4-methylimidazole. The morpholine compounds include, for example, N-methylmorpholine. The hexahydro-s-triazine compounds include, for example, N,N',N''-tris(-dimethylaminopropyl)hexahydro-s-triazine. The diazabicyclo compounds include, for example, 1,8-diazabicyclo[5,4,0]-7-undecene and 1,4-diazabicyclo[2,2,2]octane.

The quaternary ammonium salt compounds effectively promote the cyclization-trimerization reaction of the polyisocyanate compound (a), and the oxazolidone ring structure-forming reaction of the polyisocyanate compound (a) and the glycidyl acrylate compound (b) and other epoxy compound.

The quaternary ammonium salt compounds usable for the present invention are preferably selected from the compounds of the formula:

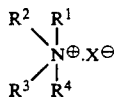

wherein $R^1$, $R^2$, $R^3$ and $R^4$ respectively and independently represent a member selected from the group consisting of aliphatic, cycloaliphatic and aromatic hydrocarbon groups having 1 to 20 carbon atoms, and these groups being unsubstituted or substituted by at least one member selected from hydrogen and halogene atoms, the sum of the carbon atoms in the $R^1$, $R^2$, $R^3$ and $R^4$ groups being 12 or more and X represents a member selected from the group consisting of chlorine and fluorine atoms.

The $R^1$, $R^2$, $R^3$ and $R^4$ groups are preferably respectively and independently selected from methyl, ethyl, propyl, butyl, decyl, tetradecyl, 2-hydroxyethyl, benzyl, cyclohexyl and phenyl groups. Preferably, the quaternary ammonium salt compounds include tetra-n-butylammonium fluoride, tetra-n-butylammonium chloride, benzalkonium fluoride, benzalkonium chloride, tetra-n-decyltrimethylammonium fluoride, tetra-n-decyltrimethylammonium chloride, benzyldi(2-hydroxyethyl)methylammonium fluoride and benzyldi(2-hydroxyethyl)methylammonium chloride.

When the sum of the carbon atoms of the $R^1$ to $R^4$ groups is less than 12, the resultant quaternary ammonium salt compound exhibits a poor solubility in the glycidyl acrylate compound (b), and thus the resultant second individual liquid component (B) becomes undesirably non-homogeneous.

In the curing step of the resinous composition of the present invention, cyclization reactions, i.e., a tri-cyclization reaction of the isocyanate groups and an oxazolidone ring-forming reaction of the isocyanate group with the epoxy groups, and a radical polymerization reaction of the vinyl groups of the glycidyl acrylate compound (b) occur concurrently.

In this case, where the tri-cyclization reaction occurs prior to the radical polymerization reaction, the resultant cured resin exhibits excellent physical properties, but if the radical polymerization reaction occurs prior to the tri-cyclization reaction, the resultant shaped resin article is extremely fragile, and thus is easily cracked.

When the quaternary ammonium salt compounds in which the cation represented by X consists of a fluorine or chlorine atom, are used as a cyclization catalyst, the resultant cured resin exhibits physical properties superior to those obtained when the cation consists of a bromine or iodine atom.

The cyclization catalyst (c) comprises only one of the above-mentioned compounds or a mixture of two or more of the above-mentioned compounds. For example, a cyclization catalyst comprising a mixture of an imidazole compound and a triazine compound in a mixing weight ratio of about 1:1 exhibits a higher catalytic activity than that of a catalyst consisting of only one of the above-mentioned compounds. Also, where a cyclization catalyst is prepared from a mixture of a compound having a relatively low catalytic activity, for example, 2,4,6-tris(dimethylaminomethyl)phenol with a triazine compound having a relatively high catalytic activity, the reaction rate of the cyclization reaction can be controlled by controlling the mixing ratio of the above-mentioned compounds with each other.

Preferably, in the resinous composition of the present invention, the cyclization catalyst (c) is present in an amount of 0.001 to 10 parts by weight, more preferably 0.005 to 5 parts by weight, per 100 parts by weight of the polyisocyanate compound (a). If the amount of the cyclization catalyst (c) is too low, the cyclization reaction of the polyisocyanate compound (a) occurs at an undesirably low reaction rate. If the amount of the cyclization catalyst (c) is too high, the cyclization reaction rate becomes too high and sometimes an undesirable foaming occurs.

Optionally, an acid stabilizer is added to the cyclization catalyst (c), to enhance the storage stability of the resinous composition.

If the cyclization catalyst (c) contains a halogenated tetraalkyl ammonium compound or a metal halide compound in addition to the tertiary amine compound, a preferential formation of isocyanurate ring structures is hindered by the above-mentioned compound and the heat resistance of the resultant cured resin is not enhanced. Also, when the metal halide compound remains in the resultant cured resin, the electric properties of the cured resin are affected by the compound.

When the tertiary amine compound is aged in the presence of an epoxy group-containing compound, the cyclization catalytic activity of the tertiary amine compound is enhanced, and the cyclization reaction can be significantly accelerated. Accordingly, where the resinous composition containing the aged tertiary amine compound as a cyclization catalyst can be fed at a high supply capacity, the production of the shaped resin article can be carried out by a cyclic process.

Where the quaternary ammonium salt compound is used as a cyclization catalyst, however, the resultant cyclization reaction rate is lower than when the tertiary amine compound is used, although the reaction stability is higher than when the tertiary amine compound is used. Accordingly, the quaternary ammonium salt compound is suitable for a reaction apparatus having a relatively low supply capacity of the resinous composition, and for a production of, for example, RTM, which is preferably produced at a relatively low curing reaction rate.

The radical catalyst (d) is contained in at least one of the first and second individual liquid components (A) and (B).

The radical catalyst (d) preferably comprises at least one member selected from organic peroxide compounds and organic azo compounds. The organic peroxide compounds usable for the present invention include ketone peroxide compounds, for example, methylethylketone peroxide, cyclohexanone peroxide, and methylisobutylketone peroxide; organic hydroperoxide compounds, for example, cumen hydroperoxide, and tertiary butyl hydroperoxide; peroxyester compounds, for example, tertiary butyl peroxyotoate and tertiary butyl peroxybenzoate; dialkyl peroxide compounds, for example, 1,3-bis(tert-butylperoxyisopropyl)benzene, dicumylperoxide, and tris(tert-butylperoxide)triazine; diacylperoxide compounds, for example, isobutyrylperoxide, lauroylperoxide and benzoylperoxide; peroxyketal compounds, for example, 1,1-di-tert-butylperoxy cyclohexane, 2,2-di(tert-butylperoxy)butane; and percarbonate compounds, for example, tert-butylperoxyisopropyl carbonate, bis(4-tert-butylcyclohexyl)peroxydicarbonate, di-3-methoxybutylperoxydicarbonate.

The organic azo compounds usable for the present invention include azobisalkanonitrile compounds, for example, azobisisobutylonitrile and azobiscarbonamide.

The radical catalyst (d) comprises only one of the above-mentioned compounds or a mixture of two or more thereof.

In the resinous composition of the present invention, the radical catalyst (d) is preferably present in a total amount of 0.05 to 15%, more preferably 0.1 to 10%, still more preferably 0.2 to 5%, based on the total weight of ethylenically unsaturated compounds, i.e., the glycidyl acrylate compound, and optionally, an additional ethylenically unsaturated compound.

To the radical catalyst (d) is optionally added a small amount of a polymerization-promoting agent comprising at least one organic acid salt of a multivalent metal, for example, an octylic acid salt or naphtenic acid salt of a heavy metal, for example, cobalt, manganese, iron, or copper, and the like and at least one tertiary amine compound, for example, dimethyl aniline or dimethyl-p-toluidine; and/or a polymerization inhibitor comprising at least one member selected from hydroquinone, naphthoequinone, tert-butylcatecol, p-benzoquinone, butylated hydroxytoluene and nitroxide radical compounds. These additives are used to control the curing reaction rate and pot-life, of the resinous composition.

The second individual liquid component (B) optionally further comprises at least one member selected from the group consisting of polyol compounds (e) and polyepoxy compounds (f).

The polyol compounds (e) usable for the present invention have at least two aliphatic or cycloaliphatic hydroxyl groups. Those polyol compounds (e) include (i) polyetherpolyol compounds, for example, polyethylene glycol, polypropylene glycol, polytetramethylene glycol and polyol compounds that are addition products of aromatic polyols, for example, bisphenol A, with ethylene oxide or propylene oxide, addition products of propylene glycol with ethylene oxide, addition products of a member selected from glycerol, pentaerythritol, sorbitol, trimethylpropane, and N-substituted diethanolamine with at least one member selected from ethylene oxide and propylene oxide; (ii) polyester polyol compounds, for example, adipate polyol compounds, phthalate polyol compounds, polyol compounds and polycarbonate polyol compounds, (iii) polymeric polyol compounds having repeated units, for example, polyetherpolyesterpolyol and polyesterpolyamidepolyol compounds; (iv) ethylene glycol, propylene glycol, 1,3-butanediol, dipropylene glycol, 1,4- and 1,5-hexanediol, glycerol and pentaerythritol, sorbitol, trimethylolpropane, N-mono-aromatic, cycloaliphatic and aliphatic radical-substituted diethanol amines; (v) cyclohexane diol, cyclohexane dimethanol, and hydrogenated bisphenol A; and (vi) polybutadiene derivatives, butadiene-styrene copolymer derivatives and butadiene-acrylonitrile copolymer derivatives each having terminal hydroxyl groups.

The polyol compounds (e) can be employed alone or as a mixture of two or more thereof. Preferably, the polyol compounds (e) are present in the mixed state, to ensure an effective control of the heat resistance and impact strength of the resultant shaped resin article, or to obtain a balanced moldability or reactivity of the resultant resinous composition.

Among the above-mentioned polyol compounds, slightly polymerized polyol compounds are most useful for obtaining shaped resin articles having an excellent impact strength, and a polyether polyol compound and a mixture thereof with another polyol compound are most useful for obtaining a shaped resin articles having a superior heat resistance and water resistance.

Also, the polyol compounds (e) are preferably in the state of a liquid at room temperature.

In the resinous composition of the present invention, the polyisocyanate compound (a) and the cyclization catalyst (c) effectively enhance the heat resistance of the resultant shaped resin article by a cyclization-trimerization of the isocyanate groups to form an isocyanurate ring structure in the resultant cured resin molecule and the polyisocyanate compound (a) and the polyol compound (e) effectively improve the toughness of the resultant shaped resin article by forming an urethane structure which serves as soft segments in the resultant cured resin molecule.

In the resinous composition of the present invention comprising the polyisocyanate compound (a) and the glycidyl acrylate compounds (b), the polyisocyanate compound (a) is preferably present in an amount of 120 to 1000 equivalents, more preferably 150 to 900 equivalents, still more preferably 160 to 800 equivalents, of the isocyanate groups thereof, per 100 equivalents of the epoxy groups of the glycidyl acrylate compound (b).

When the polyol compound (e) is used together with the polyisocyanate compound (a) and the glycidyl acrylate compound (b), the polyol compound (e) is preferably employed in an amount such that the total amount of the hydroxyl groups of the polyol compound in the resinous composition is 5 to 75 equivalents, more preferably 7 to 60 equivalents, still more preferably 9 to 50 equivalents, per 100 equivalent of a difference between the amounts in equivalent of the isocyanate groups of the polyisocyanate compound (a) in the first individual liquid component (A) and the total epoxy groups of the glycidyl acrylate compound (b).

When the polyisocyanate compound (a), the glycidyl acrylate compound (b) and the polyol compound (e) are respectively employed in an amount outside of the above-mentioned ranges, the resultant mixture of the first and second individual liquid components (A) and (B) sometimes exhibit an undesirably high viscosity or a poor moldability, and the resultant shaped resin article sometimes exhibits an unsatisfactory physical property. For example, if the polyol compound (e) is employed in an excessively large amount, the resultant mixture exhibits an undesirably high viscosity and the resultant shaped resin article exhibits a low heat resistance, and if the amount of the polyol compound (e) is too small, the resultant shaped resin article exhibits a poor toughness and tenacity.

The polyepoxy compounds (f) have at least two epoxy groups contained in the molecule thereof, and preferably include the following compounds:

(i) Glycidylether compounds of aromatic polyols, for example, 2,2-bis(4-hydroxyphenyl)propane (bisphenol A), 4,4'-dihydroxydiphenylmethane, 4,4'-dihydroxydiphenylsulfone, resorcinol, phenol novolak, cresol novolak, resorcinol novolak, naphthol novolak, dihydroxynaphthalene and dihydroxynaphthalene novolak; of polyol compounds produced from a dehydration reaction of aromatic dihydroxy compounds, for example, phenol, dihydroxybenzene, naphthol and dihydroxynaphthalene with aldehyde compounds, for example, glyoxal, gultaric aldehyde, p-hydroxybenzaldehyde, p-formylbenzoic acid and benzaldehyde, in the presence of an acid catalyst; of polyhydric alcohol compounds, for example, hydrogenated bisphenol A, butanediol, polypropylene glycol, polyethylene glycol and glycerol.

(ii) Glycidylester compounds of dicarboxylic acids, for example, phthalic acid, isophthalic acid, tetrahydrophthalic acid and naphthalene dicarboxylic acid.

(iii) N-glycidylamine compounds of nitrogen containing compounds, for example, aniline, isocyanuric acid and methylene dianiline, in which N-glycidylamino compounds the active hydrogen atoms attached to nitrogen atoms of the compound are substituted by glycidyl groups.

(iv) Glycidyletherester compounds of hydroxycarboxylic acids, for example, p-hydroxybenzoic acid and hydroxynaphthoic acid.

(v) Cycloaliphatic polyepoxy compounds, for example, cyclopentadienedioxide, dicyclopentadienedioxide, vinylcyclohexenedioxide and compound of the formulae:

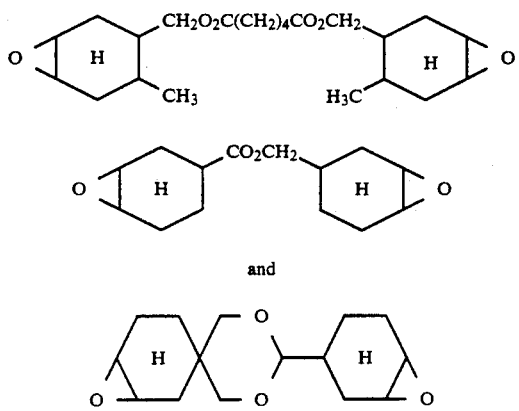

and (vi) Others; for example, triglycidyl compound of p-aminophenol.

The most preferable polyepoxy compounds for the present invention are bisphenol A diglycidylether, bisphenol F diglycidylether and cycloaliphatic epoxy compounds, which are in the state of a liquid having a low viscosity at room temperature. To obtain a shaped resin article having an enhanced heat resistance, the most preferable polyepoxy compounds are polyglycidylether compounds of phenol novolak and cresol novolak in the state of a liquid or semi-liquid at room temperature.

When the resinous composition of the present invention comprises the polyisocyanate compound (a), the glycidyl acrylate compound (b) and the polyepoxy compound (f), the polyisocyanate compound (a) is preferably present in an amount of 120 to 1000 equivalents, more preferably 150 to 900 equivalents, still more preferably 160 to 800 equivalents, of the isocyanate groups thereof per 100 equivalent of the total epoxy groups of the glycidyl acrylate compound (b) and the polyepoxy compound (f).

Also, the glycidyl acrylate compound (b) is preferably used in an amount of 10 to 1000 parts by weight, more preferably 15 to 800 parts by weight, still more preferably 20 to 750 parts by weight, per 100 parts by weight of the polyepoxy compound (f).

When the resinous composition of the present invention comprises the polyisocyanate compound (a), the glycidyl acrylate compound (b), the polyol compound (e), and the polyepoxy compound (f), the polyisocyanate compound (a) is preferably used in an amount of 120 to 1000 equivalents, more preferably 150 to 900 equivalents, still more preferably 160 to 800 equivalents, of the isocyanate groups thereof, per 100 equivalents of the total epoxy groups of the glycidyl acrylate compound (b) and the polyepoxy compound (f). Also, the polyol compound is preferably present in an amount of 5 to 75 equivalents, more preferably 7 to 60 equivalents, still more preferably 9 to 50 equivalents, per 100 equivalents of a difference between the amount in equivalent of the isocyanate groups of the polyisocyanate compound (a) and the total amount in equivalent of the epoxy groups of the glycidyl acrylate compound (b) and the polyepoxy compound (f).

The presence of the polyol compound (e) and the polyepoxy compound (f) in the resinous composition of the present invention is effective for the formation of oxazolidone ring structures from the reaction of the epoxy groups with the isocyanate groups, in addition to the above-mentioned urethane structures in the resultant cured resin. The oxazolidone ring structures are linear and have a high heat resistance, and thus contribute to an enhancement of the heat resistance and toughness of the resultant cured resin.

The resinous composition optionally contains, in addition to the above-mentioned compounds (a) through (f), at least one additional compound capable of reacting with at least one of the compounds (a), (b), (e) and (f), to thus improve the properties of the resultant resinous composition. The additional compound is selected from, for example, (i) polyamine compounds capable of reacting with the polyisocyanate compound (a) to form urea bonds, to introduce soft segments into the resultant cured resin and to enhance the mechanical property of the cured resin; (ii) ethylenically unsaturated compounds, for example, vinyl ester compounds, maleimide and arylimide, and unsaturated polyesters capable of reacting with vinyl groups of the glycidyl acrylate compound (b) and effectively lowering the viscosity of the resinous composition to thus enhance the handling property of the resinous composition, and enhancing the heat resistance and the mechanical property of the resultant cured resin; (iii) monoepoxy compounds reactive with the isocyanate groups of the polyisocyanate compound (a) and effectively lowering the viscosity of the resultant resinous composition, and enhancing the handling property of the composition; (iv) polyphenol compounds reactive with the epoxy groups of the glycidyl acrylate component (b), and thus capable of serving as an epoxy-curing agent, these compounds effectively enhancing the mechanical property of the resultant cured resin and controlling the reaction rate of the resinous composition; and (v) cyclic iminoether compounds reactive with the epoxy groups of the glycidyl acrylate compound (b) and the polyepoxy compound (f) or the hydroxyl groups of the polyol compound (e) and effectively enhancing the mechanical property of the cured resin.

The resinous composition of the present invention optionally contains, in addition to the cyclization catalyst (c) and the radical catalyst (d), a tin compound-containing urethane reaction catalyst, for example, dibutyl tin dilaurate, preferably used where the polyol compound (e) is contained in the resinous composition and the cyclization catalyst (c) comprises a quaternary ammonium salt compound, and carbodiimide catalyst, epoxy-curing catalyst and the like selected and used in response to the type of the compounds (a) to (f).

In a preferable embodiment of the resinous composition of the present invention, the polyisocyanate compound (a) is a modified 4,4'-diphenylmethanediisocyanate or tolylene diisocyanate in the state of a liquid having a viscosity of 25 poises or less at a temperature of 25° C., the glycidyl acrylate compound (b) is glycidyl methacrylate, and the polyol compound (e) is a polyetherpolyol or polyester polyol. The cyclization catalyst (c) and the radical catalyst (d) can be selected in response to the reaction conditions, for example, reaction temperature and time.

In the process of the present invention for producing a shaped resin article from the above-mentioned two or three liquid pack type heat curable polyisocyanate-glycidyl acrylate compound resinous composition.

In the two liquid pack process, a first individual liquid component (A) comprising at least one polyisocyanate compound (a) and optionally a radical curing catalyst (d) is evenly mixed with a second individual liquid component (B) comprising at least one glycidyl acrylate compound (b), a cyclization catalyst (c), and optionally, a radical catalyst (d) and at least one member selected from polyol compounds (e) and polyepoxy compound (f), immediately before a molding step in a mixing head, to prepare a heat curable liquid resinous mixture.

The liquid resinous mixture is fed into a mold heated at a predetermined temperature, and is heat-cured in the mold. The shaping step can be carried out by a coating, spraying or dipping method.

In the two liquid pack process, the first and second individual liquid components (A) and (B) can be respectively and independently stored with a high storage stability. Depending on the type of radical catalyst (d), a portion of the catalyst (d) is contained in the first individual liquid component (A), and enhances the storage stability of the component (A).

In the three liquid pack method, the first individual liquid component (A) is the same as mentioned above, and the second individual liquid component (B) is composed of an individual sub-component (i) comprising at least one glycidyl acrylate compound (a), and an individual sub-component (ii) comprising a cyclization catalyst (c). At least one of the first individual component (A), and the individual sub-components (i) and (ii) contains the radical curing catalyst. In an embodiment of the present invention, at least one of the individual sub-compositions (i) and (ii) contains at least one polyol compound (e).

In another embodiment of the present invention, the individual sub-component (i) optionally contains at least one polyepoxy compound (f).

In still another embodiment of the present invention, the individual sub-component (i) contains at least one polyepoxy compound (f) and at least one of the individual sub-components (i) and (ii) contains at least one polyol compound (e).

The two or three liquid pack process of the present invention can be readily carried out in practical industrial use, and the storage stability, reaction controllability, handling property, and operating simplicity of the individual components are excellent.

In the two or three liquid pack process of the present invention, the heating curing step is preferably carried out at a temperature of from 10° C. to 280° C., more preferably from 15° C. to 240° C., still more preferably 20° C. to 200° C., this temperature being variable depending on the compositions of the individual components. After the heating curing step, the cured shaped resin article is optionally further heat treated, to enhance the heat resistance of the resultant article. Also, the heat curing step is carried out for a time long enough to complete the curing reaction of the liquid resinous mixture, preferably 10 seconds to 24 hours, more preferably 20 seconds to 10 hours, still more preferably 30 seconds to 6 hours; this time is variable in response to the composition of the individual components and curing temperature.

The heat curing step can be carried out under an ambient atmospheric pressure, or under pressurized conditions. Usually, the heat curing step is preferably carried out in an inert gas atmosphere comprising nitrogen gas or argon gas, to prevent a penetration of water from the ambient air atmosphere into the liquid resinous mixture or an oxidization and deterioration of the liquid resinous mixture and the resultant cured resin.

After the heat curing step, the resultant shaped resin article is taken out of the mold.

In the two or three liquid pack process of the present invention, a fibrous reinforcing material, for example, thermoplastic polymer fibers, for example, aramid fibers, and inorganic fibers, for example, carbon fibers or glass fibers, filler, elastomer, pigment, coloring matter, antioxidant, ultraviolet ray absorbing agent, releasing agent, or shrinkage-reducing agent, for example, thermoplastic polymer, bicyclo compound or spiro compound, is optionally added to the liquid resinous mixture.

For example, the reinforcing material is formed into a desired form and dimensions and placed in the mold, and then the liquid resinous mixture is fed into the mold. In this case, the liquid resinous mixture is cured in the presence of the reinforcing material therein, and thus the resultant shaped resin article is a composite material including the reinforcing material.

In the present invention, the liquid resinous mixture prepared from the first and second individual liquid components (A) and (B) is in the state of a liquid having a relatively low viscosity, and thus easily flows into the mold under a relatively low pressure, and rapidly penetrates the reinforcing material such as fibrous reinforcing material, and can be supplemented with a relatively large amount of the filler. Namely, the liquid resinous mixture of the present invention exhibits a satisfactory handling property and operating simplicity.

After the heat curing step, the resultant cured resin has isocyanurate ring structures derived from a cyclization-trimerization reaction (tri-cyclization) of the isocyanate groups of the polyisocyanate compound (a) and oxazolidone ring structures derived from a reaction of the isocyanate groups with the epoxy groups of the glycidylacrylate compound (b), and thus the resultant shaped resin article exhibits an excellent heat resistance, chemical resistance, and mechanical property.

When the resinous composition contains a polyol compound (e), the resultant cured resin further has urethane structures derived from the reaction of the isocyanate group and the hydroxyl groups of the polyol compound (e). Also, when the resinous composition contains a polyepoxy compound (f), the resultant cured resin further has additional oxazolidone ring structures derived from the reaction of the isocyanate groups with the epoxy groups of the polyepoxy compound (f). Therefore, the resultant shaped resin article exhibits an excellent heat resistance and mechanical property such as toughness.

The two or three liquid pack process of the present invention can produce a shaped resin article, having the above-mentioned excellent properties, with a high reproducibility and efficiency.

EXAMPLE

The present invention will be further explained by the following specific examples In the examples, the following tests were applied to the resultant shaped resin articles.

(1) Heat Distortion Temperature (HDT)

The heat distortion temperature was measured by an HDT tester, available under the trademark of HDT and VSP Tester, from Toyo Seiki Seisakusho, under a load of 18.5 kgf/cm$^2$.

(2) Notched Izod (N.I.) Impact Strength

This impact strength was measured in accordance with Japanese Industrial Standard (JIS) K 6911. The specimen had a thickness of 3 mm.

EXAMPLES 1 TO 3

In each of Examples 1 to 3, a first individual liquid component (A) was prepared from 284 g of a carbodiimide-modified 4,4′-diphenylmethanediisocyanate having an isocyanate equivalent amount of $6.90 \times 10^{-3}$ equivalents/g and a low viscosity.

A second individual liquid component (B) was prepared from a glycidyl acrylate compound of the type and in the amount as indicated in Table 1, and catalysts (c) and (d) consisting of the compounds of the types and in the amounts as shown in Table 1.

The resultant second individual component (B) was in the state of a liquid having a low viscosity.

TABLE 1

| | Composition of second individual component (B) | | | | |
|---|---|---|---|---|---|
| | Glycidyl compound (b) | | Catalysts (c) and (d) | | HDT of |
| Example No. | Type | Amount (g) | Type | Amount (g) | shaped resin article (°C.) |
| 1 | Glycidyl acrylate | 128 | TDHT(*)1 | 2.0 | 259 |
| | | | 1-Cyanoethyl-2-ethyl-4-methyl-imidazol | 2.0 | |
| | | | BPOB(*)2 | 4.0 | |
| 2 | β-methylglycidyl methacrylate | 156 | TDHT(*)1 | 2.2 | 262 |
| | | | Imidazole | 2.2 | |
| | | | BPOB(*)2 | 4.4 | |
| 3 | β-methylglycidyl acrylate | 142 | TDHT(*)1 | 2.1 | 253 |
| | | | Imidazole | 2.1 | |
| | | | BPOB(*)2 | 4.2 | |

Note:
(*)1 ... N,N′,N″-tris(dimethylaminopropyl)hexahydro-S-triazine
(*)2 ... 1,3-bis(tert-butylperoxyisopropyl)benzene The first and second individual liquids (A) and (B) were degassed under vacuum.

The degassed first and second individual liquids (A) and (B) were introduced into a static mixer and mixed together, and the resultant liquid resinous mixture was fed into a mold having an inside thickness of 3 mm, through a conduit connected to the mixer, at room temperature (about 30° C.) and left in the mold for 15 minutes. The resultant cured, shaped resin article was removed from the mold, and a cured resin plate having a thickness of 3 mm was obtained. This plate was further post-cured at a temperature of 150° C. for 2 hours.

The post-cured resin plate exhibited the HDT as shown in Table 1.

EXAMPLE 4

The same procedures as in Example 1 were carried out, with the following exceptions.

The first individual liquid component (A) consisted of the polymethylenepolyphenylpolyisocyanate as indicated in Table 2.

The second individual liquid component (B) consisted a solution of 2.1 g of N,N′,N″-tris(dimethylaminopropyl) hexahydro-S-triazine, 2.1 g of imidazole and 4.2 g of 1,3-bis(tert-butylperoxyisopropyl)benzene in 140 g of glycidyl methacrylate.

The HDT test result is shown in Table 2.

TABLE 2

| Example No. | First individual component A | | HDT (°C.) |
|---|---|---|---|
| | Compound (a) | Amount (g) | |
| 4 | Polymethylenepolyphenylenepolyisocyanate having a viscosity of 149 c poises at 25° C. and an isocyanate equivalent amount of | 280 | 228 |

TABLE 2-continued

| Example No. | First individual component A Compound (a) | Amount (g) | HDT (°C.) |
|---|---|---|---|
| | 7.14 × 10⁻³ equivalents/g | | |

EXAMPLES 5 TO 14

In each of Examples 5 to 14, the same procedures as in Example 1 were carried out, with the following exceptions.

The same first individual component (A) as in Example 1 was used in an amount of 28.4 g.

The second individual component (B) consisted of a solution of the catalyst as shown in Table 4 in 14.0 g of glycidylmethacrylate.

TABLE 3

| Example No. | Second individual component (B) Catalyst | Amount (g) | Reaction temperature (°C.) | Gelation time (sec) |
|---|---|---|---|---|
| 5 | TDHT | 0.42 | room temperature (about 30° C.) | 130 |
|   | BPOB | 0.84 | | |
| 6 | TDHT | 0.042 | room temperature (about 30° C.) | 265 |
|   | imidazole | 0.42 | | |
|   | BPOB | 0.84 | | |
| 7 | TDHT | 0.42 | room temperature (about 30° C.) | 80 |
|   | imidazole | 0.42 | | |
|   | BPOB | 0.84 | | |
| 8 | TDHT | 0.042 | room temperature (about 30° C.) | 700 |
|   | Benzyldimethyl-amine | 0.42 | | |
|   | BPOB | 0.84 | | |
| 9 | Benzyldimethyl-amine | 0.42 | room temperature (about 30° C.) | 1140 |
|   | BPOB | 0.84 | | |
| 10 | N-methyl-morpholine | 0.42 | 100° C. | 840 |
|    | BPOB | 0.84 | | |
| 11 | TDHT | 0.27 | Room temperature (about 30° C.) | 90 |
|    | N,N,N',N''-tetra-glycidylmethylene-dianiline | 0.42 | | |
|    | BPOB | 0.84 | | |
| 12 | TDHT | 0.42 | Room temperature (about 30° C.) | 150 |
|    | Hexamethylene-tetramine | 0.42 | | |
|    | BPOB | 0.84 | | |
| 13 | Benzyl dimethylamine | 0.42 | 120 | 388 |
|    | BPOB | 0.84 | | |
| 14 | 2,4,6-tris(dimethyl-aminomethyl)phenol | 0.42 | 140 | 210 |
|    | BCPC(*)3 | 0.84 | | |

(*)3 ... Bis(4-tert-butylcyclohexyl)peroxycarbonate

Immediately after the second individual component (B) was prepared, the first and second individual components (A) and (B) were placed in a test tube and immediately mixed together. The mixture in the test tube was heated at a temperature as shown in Table 3, and a gelation time of the mixture was measured. The measured gelation time is indicated in Table 3.

Table 3 clearly shows that the curing reaction of the resinous composition of the present invention can be readily controlled by adjusting the compositions of the catalysts (c) and (d).

Namely, it is possible to complete the curing reaction of the resinous composition.

EXAMPLES 15 TO 18

The same procedures as in Example 5 were carried out, with the following exceptions.

A first individual component (A) consisted of 142 g of a carbodiimide-modified 4,4'-diphenylmethanediisocyanate having an isocyanate equivalent amount of $6.90 \times 10^{-3}$ equivalent/g.

A second individual component (B) was prepared by dissolving 1.06 g of benzyldimethylamine 2.12 g of BPOB and optionally an acid stabilizer of the type and in the amounts as indicated in Table 4 in 70 g of glycidylmethacrylate, and aging the resultant solution at room temperature for 24 hours.

The first and second individual components (A) and (B) were mixed in a test tube in the same manner as in Example 5, and the gelation time of the resultant liquid resinous mixture was measured at room temperature (about 30° C.). The resultant gelation times are shown in Table 4.

Separately, 40.6 g of the first individual component (A) were mixed with 20 g of the second individual component (B), the resultant mixture was subjected to the same mold-curing process as in Example 1, at a temperature of 100° C. for 30 minutes, and the resultant cured article was post-cured at a temperature of 180° C. for 2 hours. The resultant resin article had the HDT as shown in Table 4.

Further, the second individual component (B) was stored separately at room temperature for the time as shown in Table 4. The resultant stored component (B) had the viscosity as shown in Table 4.

TABLE 4

| Example No. | Acid stabilizer in second individual component (B) Compound | Amount (g) | Gelation time (sec) | HDT (°C.) | Storage second component (B) Storage time (day) | Viscosity (cps) |
|---|---|---|---|---|---|---|
| 15 | — | 0 | 12 | 292 | 1 | ≦5 |
| 16 | — | 0 | 18 | 295 | 60 | ≦5 |
| 17 | Phenol | 0.08 | 41 | 282 | 100 | ≦5 |
| 18 | Bisphenol A | 0.19 | 42 | 285 | 100 | ≦5 |

Table 4 clearly shows that the resinous compositions of Examples 15 to 18 had an excellent storage stability and an excellent handling property and heat resistance, even after storage.

EXAMPLE 19

The same procedures as in Example 1 were carried out, with the following exceptions.

A first individual component (A) consisted of 159 g of a polyol-modified 4,4'-diphenylmethanediisocyanate having an isocyanate equivalent amount of $6.29 \times 10^{-3}$ equivalent/g.

A second individual component (B) was prepared by dissolving 1.06 g of benzyldimethylamine, 2.12 g of BPOB and the acrylonitrilebutadiene-copolymerized liquid rubber having terminal-modifying vinyl group, a molecular weight of 3500 and an acrylonitrile content of 16.2% by weight, in the amount as shown in Table 5.

The first and second individual components (A) and (B) were placed in a test tube and immediately mixed together therein, the resultant liquid resinous mixture was degassed under a vacuum, fed into a mold having an inside thickness of 3 mm and heated at a temperature of 100° C., and cured at 100° C. for 30 minutes.

The resultant cured plate having a thickness of 3 mm was removed from the mold and post-cured at a temperature of 180° C. for 2 hours.

The resultant plate had a HDT and a notched Izod impact strength as indicated in Table 5.

TABLE 5

| Example No. | Amount of liquid rubber in second individual component (B) (g) | HDT (°C.) | N.I. impact strength (kg/cm/cm) |
|---|---|---|---|
| 19 | 10 | 242 | 6.00 |

The resultant cured plate exhibited an excellent heat resistance and impact strength as shown in Table 5.

EXAMPLE 20

A first individual component (A) consisted of 14.2 g of a carbodiimide-modified 4,4'-diphenylmethanediisocyanate having an isocyanate equivalent number of $6.90 \times 10^{-3}$ equivalent/g.

A second individual component (B) was prepared by dissolving 0.11 g of benzyldimethylamine and 0.22 g of BPOB in 7.0 g of glycidyl methacrylate.

The first and second individual components (A) and (B) were placed in a test tube and immediately uniformly mixed with each other, the resultant liquid resinous mixture was coated on a surface of a NaCl plate, to form a thin layer thereon, and was cured at 100° C. for 30 minutes in a heating oven and then at 180° C. for 2 hours in another heating oven. The resultant cured thin film was subjected to an infrared absorption spectrum analysis.

In the resultant IR absorption spectrum, an absorption peak at 1710 cm$^{-1}$ corresponding to an isocyanurate ring structure was observed, although absorption peaks at 2258 cm$^{-1}$ corresponding to an isocyanate group, at 1638 cm$^{-1}$ corresponding to a vinyl bond, and at 904 cm$^{-1}$ corresponding to an epoxy group, were not observed.

Accordingly, it was confirmed that the enhanced heat resistance of the cured resin of the present invention was derived from a formation of an isocyanurate ring structure in the cured resin molecule by a cyclization-trimerization of the isocyanate groups, and from an increase in the cross-linkage density due to the formation of the isocyanurate ring structure.

EXAMPLE 21

A first individual component (A) consisted of 710 g of a carbodiimide-modified 4,4'-diphenylmethanediisocyanate having an isocyanate equivalent amount of $6.90 \times 10^{-3}$ equivalent/g.

A second individual component (B) was prepared by dissolving 5.3 g of benzyldimethylamine and 10.6 g of BPOB in 350 g of glycidyl methacrylate.

A mold having inside dimensions of 38 cm × 48 cm × 3 mm was pre-heated to a temperature of 100° C., and a reinforcing material composed of 15 pieces of a plain glass weave fabric having a basis weight of 195.6 g/m$^2$, superimposed one on the other, was placed in the mold.

The first and second individual components (A) and (B) were mixed together in a static mixer, and the resultant liquid mixture was fed into the mold through a conduit under a pressure. The feeding step was carried out under a low pressure of about 2.5 kg/cm$^2$. Namely, the liquid resinous mixture of the present invention had a low viscosity, and therefore, could be fed under a low pressure.

The fed liquid resinous mixture was left in the mold at 100° C. for 20 minutes, and the resultant cured article was removed from the mold. The obtained article was a reinforced resin plate having a thickness of 3 mm, free from voids, and containing the reinforcing glass fiber fabric material.

The plate was post-cured at 180° C. for 2 hours.

The post-cured plate had a HDT of 300° C. or more, a notched Izod impact strength of 110 kg·cm/cm, a flexural strength of 44 kg/mm$^2$, and a flexural modulus of elasticity of 1890 kg/mm$^2$, determined by subjecting a specimen of the post-cured plate, having a length of 60 mm and a width of 12.7 mm, to a three-point bending test by using a 30 ton multipurpose tester (trademark: UCT-30, made by Orientec K.K.) at a span of 48 mm and at a head speed of 2 mm/min.

From the above-mentioned test results, it was confirmed that the resinous composition had a satisfactory moldability, and that the resultant cured article exhibited an excellent heat resistance, impact strength, and flexural properties.

COMPARATIVE EXAMPLE 1

A three-necked flask having a capacity of 2 liters and equipped with a calcium chloride-containing tube, a stirrer, and a condenser was charged with a solution of 140 g of glycidyl methacrylate, 0.337 g of hydroquinone, and 159 g of a polyol-modified 4,4'-diphenylmethanediisocyanate having an isocyanate equivalent amount of $6.29 \times 10^{-3}$ equivalent/g in 700 g of toluene, the solution was heated in a nitrogen gas atmosphere while stirring, and when the temperature of the solution reached 120° C., 1.04 g of benzyldimethylamine was added to the solution. Immediately after this addition, the solution become cloudy, and 2 hours thereafter, a white solid precipitate was generated. The solid precipitate had a melting point of 300° C. or more, and thus could not be subjected to a molding process.

The same procedures as mentioned above were repeated, except that the polyol-modified 4,4'-diphenylmethane diisocyanate was replaced by142 g or 284 g of a carbodiimide-modified 4,4'-diphenylmethane diisocyanate having an isocyanate equivalent amount of $6.90 \times 10^{-3}$ equivalent/g. Each of the resultant solids had a melting point of 300° C. or more, and thus could not be employed in a molding process.

From the above-mentioned experiment, it was confirmed that, in the process of Japanese Examined Patent Publication No. 53-31515, the employment of the cyclization catalyst for the present invention results in a cyclization-trimerization of isocyanate groups and in a cross-linking in a step of producing a polymerizable prepolymer, and thus the production of a curable resin thereby is practically difficult.

COMPARATIVE EXAMPLE 2

A polymerizable prepolymer was produced in accordance with the process of Japanese Examined Patent Publication No. 53-31515.

The same reactor as mentioned in Comparative Example 1 was charged with a mixture of 700 g of toluene with 140 g of glycidyl methacrylate, 0.337 g of hydroquinone and 142 g of a carbodiimide-modified 4,4'-diphenylmethane diisocyanate having an isocyanate equivalent amount of $6.90 \times 10^{-3}$ equivalent/g, the mixture was heated in an nitrogen gas atmosphere while stirring, and when the temperature of the mixture reached 120° C., 0.474 g of tetrabutyl ammonium iodide was added to the mixture and the resultant admixture was subjected to a further reaction at 120° C. for 6 hours.

Then, the resultant reaction admixture was cooled to room temperature and subjected to a distillation under a reduced pressure, to remove toluene therefrom.

The resultant product was a viscous liquid, but when a ball-falling viscosity measurement was applied to the viscous liquid, the steel ball did not sink therethrough, and therefore, the viscosity of the viscous liquid could not be determined.

Accordingly, it was confirmed that the product of the above-mentioned prior art was too viscous, and thus not easily molded.

EXAMPLE 22

A first individual component (A) consisted of 284 g of a carbodiimide-modified 4,4'-diphenylmethane diisocyanate having an isocyanate equivalent amount of $6.90 \times 10^{-3}$ equivalent/g.

A second individual component (A) was composed of an individual sub-component (i) prepared by uniformly dissolving 4.24 g of 1,1-di-tert-butylperoxy-3,3,5-trimethylcyclohexane in 140 g of glycidyl methacrylate and an individual sub-component (ii) consisting of 2.12 g of N,N-dimethylbenzylamine.

The component (A) and sub-components (i) and (ii) were degassed under a vacuum, mixed together in a static mixer, fed into a mold heated at 100° C., to form a plate having a thickness of 3 mm, and left in the mold for 30 minutes. The cured resin plate was further cured at 180° C. for 5 hours.

The resultant plate had a high HDT of 285° C.

EXAMPLE 23

A first individual component (A) consisted of 324 g of a carbodiimide-modified 4,4'-diphenylmethane diisocyanate having an isocyanate equivalent amount of $6.90 \times 10^{-3}$ equivalent/g, and a low viscosity of 45 cps at 40° C., determined by a B-type viscometer.

A second individual component B was prepared by dissolving 2.1 g of N,N',N''-tris(dimethylaminopropyl)-hexahydro-S-triazine and 4.2 g of 1,3-bis(tertbutylperoxyisopropyl)benzene in 213 g of glycidyl methacrylate, and had a low viscosity of not more than 5 cps determined at 40° C. by a B-type viscometer.

The individual components (A) and (B) were degassed under vacuum and mixed together in a static mixer, and the resultant liquid resinous mixture was fed into a mold having an inside thickness of 3 mm, at room temperature (about 30° C.), and left in the mold for 15 minutes. The resultant cured resin plate having a thickness of 3 mm was removed from the mold and further cured at 150° C. for 2 hours.

The resultant further cured resin plate exhibited a high heat distortion temperature (HDT) of 253° C., and thus had a high heat resistance.

EXAMPLE 24

The same procedures as in Example 23 were carried out except that the first individual component (A) consisted of 484 g of a polyol-modified 4,4'-diphenylmethanediisocyanate having an isocyanate equivalent amount of $6.29 \times 10^{-3}$ equivalent/g, in place of the carbodiimide-modified 4,4'-diphenylmethanediisocyanate.

The resultant further cured resin plate had an excellent heat resistance and exhibited a high HDT of 250° C.

EXAMPLE 25

A first individual component (A) consisted of 142 g of a carbodiimide-modified 4,4'-diphenylmethane diisocyanate having an isocyanate equivalent amount of $6.90 \times 10^{-3}$ equivalent/g.

A second individual component (B) was prepared by dissolving 1.06 g of benzyldimethylamine and 2.12 g of 1,3-bis(tert-butylperoxyisopropyl)benzene in 70 g of glycidyl methacrylate and aging the resultant solution at room temperature for 24 hours.

When measured at a temperature of 40° C. by a B-type viscometer, the first individual component (A) and the one day-aged second individual component (B) exhibited a viscosity of 5 cps or less.

The first individual component (A) in an amount of 14.2 g and the one day-aged second individual component (B) in an amount of 7.0 g were placed in a test tube and immediately mixed together. The gelation time of the resultant liquid resinous mixture was 12 seconds.

Separately, 40.6 g of the first individual component (A) and 20 g of the second individual component (B) were degassed under vacuum, mixed together in a static mixer, fed into a mold having an inside thickness of 3 mm, through a conduit, and cured in the mold at a temperature of 100° C. for 30 minutes, and further cured at a temperature of 180° C. for 30 minutes.

The resultant resin plate exhibited a very high HDT of 292° C.

EXAMPLE 26

The second individual component (B) of Example 25 was left to stand at room temperature for 60 days from the preparation thereof. This component (B) exhibited a viscosity of 5 cps or less and a gelation time of 18 seconds, similar to the values obtained immediately after the preparation.

The above-mentioned aged component (B) was subjected, together with the same component (A), to the same mixing, molding and curing steps as those in Example 25.

The resultant liquid resinous mixture exhibited a satisfactory moldability and the resultant cured resin plate had a very high HDT of 295° C.

Namely, it was confirmed that the second individual component (B) had a very high storage stability, and the resultant shaped resin article exhibited a very high heat resistance.

EXAMPLE 27

A first individual component (A) consisted of 710 g of a carbodiimide-modified 4,4'-diphenylmethanediisocyanate having an isocyanate equivalent amount of $6.90 \times 10^{-3}$ equivalent/g.

A second individual component (B) was prepared by dissolving 5.3 g of benzyldimethylamine and 10.6 g of BPOB in 350 g of glycidyl methacrylate.

A mold having inside dimensions of 38 cm $\times$ 48 cm $\times$ 3 mm was heated at a temperature of 100° C., and a reinforcing material composed of 22 pieces of a plain glass fiber weave having a basis weight of 195.6 g/m², superimposed one on the other, was placed in the mold.

The first and second individual components (A) and (B) were degassed under vacuum, mixed together in a static mixer, and the resultant liquid resinous mixture was fed into the mold under pressure. The necessary pressure for the feeding step was 4.5 kg/cm². Namely, the liquid resinous mixture had a low viscosity and could be easily fed into the mold under a low pressure.

After the liquid resinous mixture was cured at 100° C. for 30 minutes, the resultant cured resin plate having a thickness of 3 mm and containing the reinforcing glass fiber material was removed from the mold and further cured at 180° C. for 2 hours.

The resultant resin plate had a very high HDT of 300° C. or more, a notched Izod impact strength of 121 kg·cm/cm, a flexural strength of 54 kg/mm², and a flexural modulus of elasticity of 3030 kg/mm², determined in the same manner as mentioned in Example 21.

It was confirmed, that a shaped resin article containing a reinforcing material in a high content can be easily produced from the resinous composition of the present invention, having a high moldability, and the resultant shaped article exhibited a high heat resistivity, impact strength and flexural properties.

EXAMPLES 28 TO 31

In each of Examples 28 to 31, a first individual component (A) consisted of 284 g of a carbodiimide-modified 4,4'-diphenylmethane diisocyanate having an isocyanate equivalent amount of $6.90 \times 10^{-3}$ equivalent/g, and a second individual component (B) was prepared by dissolving a polyetherpolyol mixture of a polyetherpolyol compound prepared by an addition reaction of ethylene oxide with terminal hydroxyl groups of glycerol and having a hydroxyl value of 56 mgKOH/g with a polyetherpolyol compound prepared by an addition reaction of ethylene oxide with terminal hydroxyl groups of a polypropylenepolyetherpolyol and having a hydroxyl value of 280 mgKOH/g in a mixing weight ratio of 7:3, in the amount as shown in Table 6, 2.0 g of benzyldimethylamine and 4.2 g of BPOB, in glycidyl methacrylate in the amount as shown in Table 6.

TABLE 6

| | Item | | | |
|---|---|---|---|---|
| | Amount of glycidyl methacrylate | Amount of polyether polyol mixture | Shaped article | |
| Example No. | (First component (A)) (g) | (Second component (B)) (g) | HDT (°C.) | Notched Izod impact strength (kg · cm/cm) |
| 28 | 47 | 142 | 248 | 4.1 |
| 29 | 94 | 72 | 250 | 2.1 |
| 30 | 30 | 75 | 235 | 2.0 |
| 31 | 140 | 50 | 252 | 2.0 |

The first and second individual components (A) and (B) were degassed and mixed together in the same manner as in Example 1, and the resultant liquid resinous mixture was fed into a mold having an inside thickness of 3 mm, heated at 100° C., and cured in the mold for 30 minutes. The cured resin plate having a thickness of 3 mm was removed from the mold and further cured at 180° C. for 5 hours.

The test results of the resin plate are shown in Table 6.

EXAMPLE 32

A first individual component (A) consisted of 284 g of a carbodiimide-modified 4,4'-diphenylmethane diisocyanate having an isocyanate equivalent amount of $6.90 \times 10^{-3}$ equivalent/g.

A second individual component (B) was composed of an individual sub-component (i) consisting of 47.3 g of glycidyl methacrylate, and an individual sub-component (ii) prepared by dissolving 1.89 g of N,N-dimethylbenzylamine and 3.79 g of 1,1-di-tert-butylperoxy-3,3,5-trimethylcyclohexane in 47.3 g of a polyetherpolyol mixture of a polyetherpolyol compound prepared by an addition reaction of ethylene oxide to terminal hydroxyl groups of glycerol and having a hydroxyl value of 56 mgKOH/g with a polyetherpolyol compound prepared by an addition reaction of ethylene oxide to terminal hydroxyl groups of a polypropylenepolyetherpolyol and having a hydroxyl value of 280 mgKOH/g, in a mixing weight ratio of 7:3.

The first individual component (A) and the individual sub-components (i) and (ii) of the second individual component (B) were degassed under vacuum, mixed altogether in a static mixer, and the resultant liquid resinous mixture was fed into a mold having an inside thickness of 3 mm and heated at 120° C. and cured in the mold for 30 minutes. Thereafter, the resultant resin plate having a thickness of 3 mm was taken out of the mold and further cured at 180° C. for 5 hours.

The resultant resin plate exhibited a HDT of 277° C. and a notched Izod impact strength of 4.1 kg·cm/cm.

EXAMPLE 33

A first individual component (A) consisted of 284 g of a carbodiimide-modified 4,4'-diphenylmethane diisocyanate having an isocyanate equivalent amount of $6.90 \times 10^{-3}$ equivalent/g.

A second individual component (B) was composed of an individual sub-component (i) consisting of a solution of 66.2 g of a polyetherpolyol, compound prepared by an addition reaction of ethylene oxide to terminal hydroxyl groups of glycerol and having a hydroxyl value of 56 mgKOH/g, and 4.26 g of tert-butylperoctoate in 47.3 g of glycidyl methacrylate, and an individual sub-component (ii) prepared by dissolving 2.13 g of N,N-dimethylbenzylamine in 28.4 g of a polyetherpolyol compound prepared by an addition reaction of ethylene oxide to terminal hydroxyl groups of a polypropylene polyetherpolyol and having a hydroxyl value of 280 mgKOH/g.

The first individual component (A) and the individual sub-components (i) and (ii) of the second individual component (B) were degassed under vacuum, mixed altogether in a static mixer, and the resultant liquid resinous mixture was fed into a mold having an inside thickness of 3 mm and heated at 120° C. and cured in the mold for 30 minutes. Thereafter, the resultant resin plate having a thickness of 3 mm was taken out of the mold and further cured at 180° C. for 5 hours.

The resultant resin plate exhibited a HDT of 244° C. and a notched Izod impact strength of 4.8 kg·cm/cm.

EXAMPLES 34 AND 35

In each of Examples 34 and 35, a first individual component (A) consisted of 426 g of a carbodiimide-modified 4,4'-diphenylmethane diisocyanate having an isocyanate equivalent amount of $6.90 \times 10^{-3}$ equivalent/g.

A second individual component (B) was composed of a solution a polyetherpolyol compound prepared by an addition reaction of propylene oxide to terminal hydroxyl groups of bisphenol A and having a hydroxyl value of 138 mgKOH/g, in the amount as indicated in Table 7, 2.0 g of benzyldimethylamine and 4.2 g of BPOB in glycidyl methacrylate in the amount indicated in Table 7.

TABLE 7

| | Second individual component (B) | | Shaped article | |
|---|---|---|---|---|
| Example No. | Amount of glycidyl methacrylate (g) | Amount of polyetherpolyol compound (g) | HDT (°C.) | Notched Izod impact strength (kg · cm/cm) |
| 34 | 140 | 213 | 285 | 3.4 |
| 35 | 140 | 107 | 233 | 3.3 |

The first individual component (A) and the second individual component (B) were degassed under vacuum, mixed altogether in a static mixer, and the resultant liquid resinous mixture was fed into a mold having an inside thickness of 3 mm, through a conduit, heated at 100° C., and cured in the mold for 30 minutes. Thereafter, the resultant resin plate having a thickness of 3 mm was taken out of the mold and further cured at 180° C. for 5 hours.

The resultant resin plate exhibited the HDT and notched Izod impact strength as indicated in Table 7.

EXAMPLES 36 AND 37

In each of Examples 36 and 37, a first individual component (A) consisted of 284 g of a carbodiimide-modified 4,4'-diphenylmethane diisocyanate having an isocyanate equivalent amount of $6.90 \times 10^{-3}$ equivalent/g, and a second individual component (B) was composed of 47 g of glycidyl methacrylate, catalyst compounds of the types and in the amounts as shown in Table 8 and 142 g of a polyetherpolyol mixture of a polyetherpolyol compound prepared by an addition reaction of ethylene oxide to terminal hydroxyl groups of glycerol and having a hydroxyl value of 56 mgKOH/g with a polyetherpolyol compound prepared by an addition reaction of ethyleneoxide to terminal hydroxyl groups of a polypropylene polyetherpolyol and having a hydroxyl value of 280 mgKOH/g, in a mixing weight ratio of 7:3.

TABLE 8

| | | | | Shaped article |
|---|---|---|---|---|
| Example No. | Catalyst compounds | | Mold temperature (°C.) | HDT (°C.) | Notched Izod impact strength (kg · cm/cm) |
| | Compounds | Amount (g) | | | |
| 36 | tert-butylperoxy-2-ethylhexanoate | 4.7 | 30 | 245 | 3.6 |
| | TDHT | 2.3 | | | |
| 37 | benzoylperoxide | 4.7 | 100 | 238 | 4.2 |
| | tetrabutyl-ammonium | 2.3 | | | |
| | dibutyl tin dilaurate | 0.5 | | | |

The first individual component (A) and the second individual component (B) were degassed under vacuum, mixed altogether in a static mixer, and the resultant liquid resinous mixture was fed into a mold having an inside thickness of 3 mm and heated at the temperature as shown in Table 8, and cured in the mold for 30 minutes. Thereafter, the resultant resin plate having a thickness of 3 mm was taken out of the mold and further cured at 180° C. for 5 hours.

The resultant resin plate exhibited the HDT and notched Izod impact strength as shown in Table 8.

EXAMPLES 38 TO 40

In each of Examples 38 to 40, a first individual component (A) consisted of 284 g of a carbodiimide-modified 4,4'-diphenylmethane diisocyanate having an isocyanate equivalent amount of $6.90 \times 10^{-3}$ equivalent/g, and a second individual component (B) was composed of the glycidyl acrylate, compound of the type and in the amount as indicated in Table 9, catalyst compounds of the types and in the amounts as shown in Table 9 and 142 g of a polyetherpolyol mixture of a polyetherpolyol compound prepared by an addition reaction of ethylene oxide to terminal hydroxyl groups of glycerol and having a hydroxyl value of 56 mgKOH/g with a polyetherpolyol compound prepared by an addition reaction of ethylene oxide to terminal hydroxyl groups of a polypropylene polyetherpolyol and having a hydroxyl value of 280 mgKOH/g, in a mixing weight ratio of 7:3.

TABLE 9

| | Second individual component (B) | | | | Shaped article | |
|---|---|---|---|---|---|---|
| | Glycidyl acrylate compound | | Catalyst compound | | | Notched Izod impact strength (kg · cm/cm) |
| Example No. | Type | Amount (g) | Type | Amount (g) | HDT (°C.) | |
| 38 | Glycidyl acrylate | 45 | TDHT | 2.0 | 228 | 3.8 |
| | | | 1-cyanoethyl-2-ethyl-4-methylimidazol | 2.0 | | |
| | | | BPOB | 4.0 | | |
| 39 | β-methylglycidyl methacrylate | 50 | TDHT | 2.2 | 248 | 3.5 |
| | | | Imidazole | 2.2 | | |
| | | | BPOB | 4.4 | | |
| 40 | β-methylglycidyl acrylate | 47 | TDHT | 2.1 | 231 | 3.6 |
| | | | Imidazole | 2.1 | | |
| | | | BPOB | 4.2 | | |

The first individual component (A) and the second individual component (B) were degassed under vacuum, mixed altogether in a static mixer, and the resultant liquid resinous mixture was fed into a mold having an inside thickness of 3 mm, heated at 70° C., and cured in the mold for 10 minutes. Thereafter, the resultant resin plate having a thickness of 3 mm was taken out of the mold and further cured at 180° C. for 5 hours.

The resultant resin plate exhibited the HDT and notched Izod impact strength as shown in Table 9.

EXAMPLE 41

A first individual component (A) consisted of the polyisocyanate compound of the type and in the amount as indicated in Table 10.

TABLE 10

| | Item | | |
|---|---|---|---|
| | | | Shaped article |
| Example No. | First individual component | | Notched Izod impact strength (kg · cm/cm) |
| | Compound | Amount (g) | HDT (°C.) |
| 41 | Polymethylenepoly-phenylenepoly-isocyanate Viscosity: 149 cps at 25° C. Isocyanate equivalent amount: $7.14 \times 10^{-3}$ equivalent/g | 285 | 252 | 3.1 |

A second individual component (B) was prepared by dissolving 2.0 g of benzyldimethylamine, 4.2 g of BPOB and 142 g of a polyetherpolyol mixture of a polyetherpolyol compound prepared by an addition reaction of ethylene oxide to terminal hydroxyl groups of glycerol and having a hydroxyl value of 56 mgKOH/g with a polyetherpolyol compound prepared by an addition reaction of ethylene oxide to terminal hydroxyl groups of a polypropylene polyetherpolyol and having a hydroxyl value of 280 mgKOH/g, in a mixing weight ratio of 7:3, in 47 g of glycidyl methacrylate.

The individual components (A) and (B) were degassed under vacuum, mixed together in a static mixer, the resultant liquid resinous mixture was fed into a mold having a molding hollow with an inside thickness of 3 mm and heated at a temperature of 100° C., and cured in the mold at 100° C. for 30 minutes. The resultant cured plate having a thickness of 3 mm was taken out of the mold and further cured at a temperature of 180° C. for 5 hours.

The resultant further cured resin plate exhibited the high heat distortion temperature (HDT) and the satisfactory notched Izod impact strength as shown in Table 10.

EXAMPLES 42 AND 43

In each of Examples 42 and 43, a first individual component (A) consisted of the polyisocyanate compound of the type and in the amount as indicated in Table 11.

TABLE 11

| | Item | | |
|---|---|---|---|
| | | | Shaped article |
| Example No. | First individual component | | Notched Izod impact strength (kg · cm/cm) |
| | Compound | Amount (g) | HDT (°C.) |
| 42 | Polyol-modified 4,4'-diphenylmethane diisocyanate Isocyanate equivalent amount: | 300 | 243 | 4.3 |

TABLE 11-continued

| | Item | | |
|---|---|---|---|
| | | | Shaped article |
| Example No. | First individual component | | Notched Izod impact strength (kg · cm/cm) |
| | Compound | Amount (g) | HDT (°C.) |
| 43 | $6.29 \times 10^{-3}$ equivalent/g Tolylene-2,4-diisocyanate Tolylene-2,6-diisocyanate | 90 72 | 238 | 3.8 |

A second individual component (B) was prepared by dissolving 47 g of a polyetherpolyol mixture of a polyetherpolyol compound prepared by an addition reaction of ethylene oxide to terminal hydroxyl groups of glycerol and having a hydroxyl value of 56 mgKOH/g with a polyetherpolyol compound prepared by an addition reaction of ethylene oxide to terminal hydroxyl groups of a polypropylene polyetherpolyol and having a hydroxyl value of 280 mgKOH/g, in a mixing weight ratio of 7:3, 2.0 g of benzyldimethylamine and 4.2 g of BPOB, in 47 g of glycidyl methacrylate.

The individual components (A) and (B) were degassed under vacuum, mixed together in a static mixer, and the resultant liquid resinous mixture was fed into a mold having a molding hollow with an inside thickness of 3 mm and heated at a temperature of 100° C., and cured in the mold at 100° C. for 30 minutes. The resultant cured plate having a thickness of 3 mm was taken out of the mold and further cured at a temperature of 180° C. for 5 hours.

The resultant further cured resin plate exhibited the high heat distortion temperature (HDT) and the satisfactory notched Izod impact strength a shown in Table 11.

EXAMPLES 44 AND 45

In each of Examples 44 and 45, a first individual component (A) consisted of 284 g of carbodiimide-modified 4,4'-diphenylmethane diisocyanate having an isocyanate equivalent amount of $6.90 \times 10^{-3}$ equivalent/g.

A second individual component (B) was prepared by dissolving a polyetherpolyol mixture, in the component as shown in Table 12, of a polyetherpolyol compound prepared by an addition reaction of ethylene oxide to terminal hydroxyl groups of glycerol and having a hydroxyl value of 56 mgKOH/g with a polyetherpolyol compound prepared by an addition reaction of ethylene oxide to terminal hydroxyl groups of a polypropylene polyetherpolyol and having a hydroxyl value of 280 mgKOH/g, in a mixing weight ratio of 7:3, a distilled bisphenol F type polyepoxy compound having an epoxy equivalent amount of 158 g/equivalent and in the amount as shown in Table 12, 2.0 g of benzyldimethylamine and 4.2 g of BPOB in glycidyl methacrylate in the amount as shown in Table 12.

TABLE 12

| Example No. | Amount of glycidyl methacrylate (g) | Amount of polyetherpolyol mixture (g) | Amount of polyepoxy compound (g) | Shaped article HDT (°C.) | Notched Izod impact strength (kg · cm/cm) |
|---|---|---|---|---|---|
| 44 | 37 | 105 | 21 | 225 | 3.6 |
| 45 | 72 | 67 | 14 | 253 | 3.4 |

The individual components (A) and (B) were degassed under vacuum, mixed together in a static mixer, and the resultant liquid resinous mixture was fed into a mold having a molding hollow with an inside thickness of 3 mm and heated at a temperature of 100° C., and cured in the mold at 100° C. for 30 minutes. The resultant cured plate having a thickness of 3 mm was taken out of the mold and further cured at a temperature of 180° C. for 5 hours.

The resultant further cured resin plate exhibited the high heat distortion temperature (HDT) and the satisfactory Notched Izod impact strength as shown in Table 10.

EXAMPLE 46

A first individual component (A) consisted of 284 g of carbodiimide-modified 4,4'-diphenylmethane diisocyanate having an isocyanate equivalent amount of $6.90 \times 10^{-3}$ equivalent/g.

A second individual component (B) was composed of an individual sub-component (i) prepared by dissolving 7 g of a distilled bisphenol F type polyepoxy compound and 4.2 g of BPOB in 107 g of glycidyl methacrylate and an individual sub-component (ii) prepared by dissolving 2 g of N,N-dimethylbenzylamine in 34 g of a polyetherpolyol mixture of a polyetherpolyol compound prepared by an addition reaction of ethylene oxide to terminal hydroxyl groups of glycerol and having a hydroxyl value of 56 mgKOH/g with a polyetherpolyol compound prepared by an addition reaction of ethylene oxide to terminal hydroxyl groups of a polypropylene polyetherpolyol and having a hydroxyl value of 280 mgKOH/g, in a mixing weight ratio of 7:3.

The individual components (A) and individual such components (i) and (ii) were degassed under vacuum, mixed together in a static mixer, and the resultant liquid resinous mixture was fed into a mold having a molding hollow with an inside thickness of 3 mm and heated at a temperature of 100° C., and cured in the mold at 100° C. for 30 minutes. The resultant cured plate having a thickness of 3 mm was taken out of the mold and further cured at a temperature of 180° C. for 5 hours.

The resultant further cured resin plate exhibited a high heat distortion temperature (HDT) of 273° C. and a satisfactory Notched Izod impact strength of 3.1 kg·cm/cm.

EXAMPLE 47

A first individual component (A) consisted of 5680 g of carbodiimide-modified 4,4'-diphenylmethane diisocyanate having an isocyanate equivalent amount of $6.90 \times 10^{-3}$ equivalent/g.

A second individual component (B) was composed of an individual sub-component (i) consisting of 946 g of glycidyl methacrylate and an individual sub-component (ii) prepared by dissolving 37.8 g of N,N-dimethylbenzylamine and 75.8 g of 1,1-ditert-butylperoxy-3,3,5-trimethylcyclohexane in 946 g of a polyetherpolyol mixture of a polyetherpolyol compound prepared by an addition reaction of ethylene oxide to terminal hydroxyl groups of glycerol and having a hydroxyl value of 56 mgKOH/g with a polyetherpolyol compound prepared by an addition reaction of ethylene oxide to terminal hydroxyl groups of a polypropylene polyetherpolyol and having a hydroxyl value of 280 mgKOH/g, in a mixing weight ratio of 7:3.

A reinforcing material composed of 220 pieces of a plain glass fiber weave having a basis weight of 195.6 g/m², superimposed one on the other, was placed in a mold having a molding hollow formed therein and having dimensions of 38 cm × 48 cm × 30 mm.

The individual components (A) and sub-components (i) and (ii) were degassed under vacuum, mixed together in a static mixer, and the resultant liquid resinous mixture was fed into the mold containing the reinforcing material and heated at a temperature of 100° C., and cured in the mold at 100° C. for 30 minutes. The resultant cured plate having a thickness of 30 mm was taken out from the mold and further cured at a temperature of 180° C. for 2 hours.

The resultant further cured resin plate exhibited a high heat distortion temperature (HDT) of 300° C. or more and a high notched Izod impact strength of 138 kg·cm/cm.

Also, the further cured resin plate exhibited a flexural strength of 53 kg/mm² and a flexural modulus of elasticity of 2980 kg/mm², determined in the same manner as in Example 21.

For comparison, the same procedures as mentioned above were repeated except that the polyetherpolyol mixture was omitted. In the mode-curing steps, the resultant cured resin material exhibited a larger reaction exotherm and thermal shrinkage than those of the present example. Accordingly, it was confirmed that the use of the polyetherpolyol compound effectively reduces the reaction exotherm and thermal shrinkage of the cured resin material during the mold-curing step.

Further, it was confirmed that a shaped article having a large thickness and containing a large amount of a reinforcing material can be produced by using the resinous composition of the present invention, without difficulty.

EXAMPLES 48 TO 52 AND COMPARATIVE EXAMPLE 3

In each of Examples 48 to 52 and Comparative Example 3, a first individual component (A) consisted of 284 g of carbodiimide-modified 4,4'-diphenylmethane diisocyanate having an isocyanate equivalent amount of $6.90 \times 10^{-3}$ equivalent/g.

A second individual component (B) was prepared by dissolving a polyepoxy compound of the type and in the amount as shown in Table 13, 2.1 g of N,N',N''-tris(-dimethylaminopropyl)hexahydro-S-triazine and 4.2 of BPOB in 140 g of glycidyl methacrylate.

TABLE 13

| Item | Polyepoxy compound Type | Epoxy equivalent amount | Amount (g) | HDT (°C.) | Shaped Article Notched Izod impact strength (kg · cm/cm) |
|---|---|---|---|---|---|
| Example No. | | | | | |
| 48 | Bisphenol-A type polyepoxy compound | 186 g/eq | 35 | 226 | 2.0 |
| 49 | Phenol novolak type polyepoxy compound | 180 g/eq | 50 | 221 | 2.1 |
| 50 | Tetraglycidyl methylene dianiline | 118 g/eq | 59 | 255 | 2.0 |
| 51 | Polyepoxy compound(*)5 | 181 g/eq | 91 | 229 | 2.1 |
| 52 | Polyepoxy compound(*)6 | 143 g/eq | 72 | 230 | 2.0 |
| Comparative Example 3 | None | — | — | 285 | 1.2 |

Note:
(*)5 The compound of the formula:

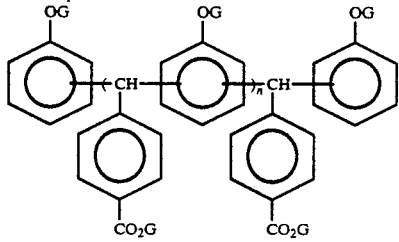

wherein G represents a —CH$_2$CH—$\overset{O}{\triangle}$—CH$_2$ group, and an average value of n is 0.1.

(*)2 The compound of the formula:

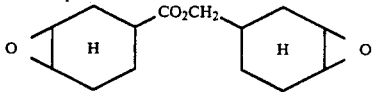

The individual components (A) and (B) were degassed under vacuum, mixed together in a static mixer, and the resultant liquid resinous mixture was fed into a mold having a molding hollow with an inside thickness of 3 mm and cured in the mold at room temperature (about 30° C.) for 30 minutes. The resultant cured plate having a thickness of 3 mm was taken out of the mold and further cured at a temperature of 150° C. for 5 hours.

The resultant further cured resin plate exhibited the high heat distortion temperature (HDT) and the satisfactory notched Izod impact strength as shown in Table 10.

EXAMPLE 53

A first individual component (A) consisted of 284 g of carbodiimide-modified 4,4'-diphenylmethane diisocyanate having an isocyanate equivalent amount of 6.90×10$^{-3}$ equivalent/g.

A second individual component (B) was prepared by dissolving 47 g of a bisphenol F type polyepoxy compound having a epoxy equivalent amount of 158 g/eq, 2.0 g of tetra-n-butylammonium fluoride and 4.2 g of BPOB in 47 g of glycidyl methacrylate.

The first and second individual components (A) and (B) were in the state of liquid having a low viscosity at room temperature.

The individual components (A) and (B) were degassed under vacuum, mixed together in a static mixer, and the resultant liquid resinous mixture was fed into a mold having a molding hollow with an inside thickness of 3 mm and heated at a temperature of 120° C., and cured in the mold at 120° C. for 30 minutes. The resultant cured plate having a thickness of 3 mm was taken out of the mold and further cured at a temperature of 180° C. for 5 hours.

The resultant further cured resin plate exhibited a high heat distortion temperature (HDT) of 232° C. and a satisfactory notched Izod impact strength of 2.0 kg·cm/cm.

EXAMPLE 54

A first individual component (A) consisted of 284 g of carbodiimide-modified 4,4'-diphenylmethane diisocyanate having an isocyanate equivalent amount of 6.90×10$^{-3}$ equivalent/g.

A second individual component (B) was composed of an individual sub-component (i) consisting of a solution of 4.2 g of BPOB and 47 g of glycidyl methacrylate in 47 g of a bis-phenol F type polyepoxy compound having an epoxy equivalent amount of 158 g/eq, and an individual sub-component (ii) consisting of 1.89 g of N,N-dimethylbenzylamine.

The first individual component (A) and individual sub-components (i) and (ii) were in the state of a liquid having a low viscosity at room temperature.

The individual components (A) and individual sub-components (i) and (ii) were degassed under vacuum, mixed together in a static mixer, and the resultant liquid resinous mixture was fed into a mold having a molding hollow with an inside thickness of 3 mm and heated at a temperature of 120° C., and cured in the mold at 120° C. for 15 minutes. The resultant cured plate having a thickness of 3 mm was taken out of the mold and further cured at a temperature of 180° C. for 5 hours.

The resultant further cured resin plate exhibited a high heat distortion temperature (HDT) of 238° C. and a satisfactory notched Izod impact strength of 2.1 kg·cm/cm.

EXAMPLES 55 TO 59 AND COMPARATIVE EXAMPLE 4

In each of Examples 55 and 59, a first individual component (A) consisted of 14.2 g of carbodiimide-modified 4,4'-diphenylmethane diisocyanate having an isocyanate equivalent amount of $6.90 \times 10^{-3}$ equivalent/g.

A second individual component (B) was prepared by dissolving catalyst compounds of the types and in the amounts as indicated in Table 14, in 7.0 g of glycidyl methacrylate.

TABLE 14

| Example No. | Catalyst compounds | | Gelation time (sec) |
|---|---|---|---|
| | Compound | Amount (g) | |
| Example 55 | Tetra-n-butyl ammonium fluoride | 0.11 | 240 |
| | BPOB | 0.22 | |
| 56 | Tetra-n-butyl ammonium chloride | 0.11 | 200 |
| | tert-Butylperoxybenzoate | 0.20 | |
| 57 | Benzalkonium chloride | 0.12 | 420 |
| | 1,1-di-tert-butylperoxy-3,3-5-trimethylcyclohexane | 0.22 | |
| 58 | n-tetradecyltrimethyl ammonium chloride | 0.15 | 540 |
| | tert-Butylperoctoate | 0.24 | |
| 59 | Benzyldi(2-hydroxyethyl)methyl ammonium chloride | 0.08 | 215 |
| | BPOB | 0.15 | |
| Comparative Example 4 | Dimethylbenzylamine | 0.11 | 10 |
| | BPOB | 0.22 | |

Immediately after the preparation of the second individual component (B), the first individual component (A) was mixed with the second component (B) in a test tube and the gelation time of the resultant liquid resinous mixture was measured at 100° C.

The gelation test result is shown in Table 14.

In Comparative Example 4, the same procedures as mentioned above were carried out except that the second individual component (B) was prepared by dissolving dimethylbenzyl amine and a radical curing catalyst consisting of BPOB in the amounts as shown in Table 14, in 7.0 g of glycidyl methacrylate and aging the resultant solution for 2 days. The gelation test result is indicated in Table 14.

From Table 14, it is clear that the resinous compositions of the present invention exhibit a satisfactorily long gelation time, and thus can be applied to a shaped article-producing apparatus having a relatively low supply capacity of the resinous composition.

The second individual components (B) of Examples 55 to 59 were stored at room temperature for one month. After this storage, the components (B) exhibited substantially similar gelation times to those mentioned above. Namely, the components (B) of Examples 55 and 59 had an excellent storage stability.

EXAMPLES 60 TO 62 AND COMPARATIVE EXAMPLE 5

In each of Examples 60 and 62, a first individual component (A) consisted of 284 g of carbodiimide-modified 4,4'-diphenylmethane diisocyanate having an isocyanate equivalent amount of $6.90 \times 10^{-3}$ equivalent/g.

A second individual component (B) was prepared by dissolving catalyst compounds of the types and in the amounts as indicated in Table 15 in glycidyl methacrylate in the amount as indicated in Table 15.

TABLE 15

| Example No. | Amount of glycidyl methacrylate (g) | Catalyst Components | | Shaped Article HDT (°C.) |
|---|---|---|---|---|
| | | Component | Amount (g) | |
| Example 60 | 187 | TBAF[*7] | 2.1 | 256 |
| | | BPOB | 4.2 | |
| 61 | 142 | TBAF | 2.1 | 292 |
| | | BPOB | 4.2 | |
| 62 | 55 | TBAF | 1.7 | 291 |
| | | BPOB | 3.4 | |
| Comparative Example 5 | 280 | TBAF | 2.8 | 229 |
| | | BPOB | 5.6 | |

Note:
[*7] ... Tetra-n-butyl ammonium fluoride

The individual components (A) and (B) were degassed under vacuum and mixed together in a static mixer, and the resultant liquid resinous mixture was fed into a mold having a molding hollow with an inside thickness of 3 mm and heated at a temperature of 100° C., and cured in the mold at 100° C. for 30 minutes. The resultant cured plate having a thickness of 3 mm was taken out of the mold and further cured at a temperature of 180° C. for 2 hours.

The resultant further cured resin plate exhibited the high heat distortion temperature (HDT) as shown in Table 15.

In Comparative Example 5, the same procedures as mentioned above were carried out except that the liquid resinous mixture was prepared by mixing the same polyisocyanate compound as mentioned above with glycidyl methacrylate in an epoxy equivalent amount equal to the isocyanate equivalent amount of the polyisocyanate compound.

The resultant shaped article exhibited a HDT as shown in Table 15 which is lower than that of Examples 60 to 62.

EXAMPLES 63 TO 65

In each of Examples 63 and 65, a first individual component (A) consisted of 284 g of carbodiimide-modified 4,4'-diphenylmethane diisocyanate having an isocyanate equivalent amount of $6.90 \times 10^{-3}$ equivalent/g.

A second individual component (B) was prepared by dissolving 2.0 g of tetra-n-butyl ammonium fluoride and 4.2 g of BPOB in a glycidyl acrylate compound of the type and in the amount as indicated in Table 16.

TABLE 16

| Example No. | Glycidyl acrylate compound | | Shaped article HDT (°C.) |
|---|---|---|---|
| | Type | Amount (g) | |
| 63 | Glycidyl acrylate | 123 | 260 |
| 64 | β-methylglycidyl methacrylate | 156 | 265 |
| 65 | β-methylglycidyl acrylate | 142 | 255 |

The individual components (A) and (B) were degassed under vacuum and mixed together in a static mixer, and the resultant liquid resinous mixture was fed into a mold having a molding hollow with an inside thickness of 3 mm and heated at a temperature of 100° C., and cured in the mold at 100° C. for 15 minutes. The resultant cured plate having a thickness of 3 mm was taken out of the mold and further cured at a temperature of 150° C. for 5 hours.

The resultant further cured resin plate exhibited the high heat distortion temperature (HDT) as shown in Table 16.

EXAMPLES 66 AND 67

In each of Examples 66 and 67, a first individual component (A) consisted of a polyisocyanate compound of the type and in the amount as indicated in Table 17.

A second individual component (B) was composed of a solution of 2.12 g of tetra-n-butyl ammonium fluoride and 4.24 g of BPOB in 140 g of glycidyl methacrylate.

TABLE 17

| | Item | | |
|---|---|---|---|
| | Glycidyl acrylate compound | | Shaped article |
| Example No. | Type | Amount (g) | HDT (°C.) |
| 66 | Polyol-modified 4,4'-diphenylmethane diisocyanate with an isocyanate equivalent amount of 6.29 × 10⁻³ equivalent/g | 318 | 251 |
| 67 | Polymethylenepolyphenylenepolyisocyanate having an isocyanate equivalent amount of 7.14 × 10⁻³ equivalent/g | 280 | 231 |

The individual components (A) and (B) were degassed under vacuum and mixed together in a static mixer, and the resultant liquid resinous mixture was fed into a mold having a molding hollow with an inside thickness of 3 mm and heated at a temperature of 100° C., and cured in the mold at 100° C. for 30 minutes. The resultant cured plate having a thickness of 3 mm was taken out of the mold and further cured at a temperature of 180° C. for 2 hours.

The resultant further cured resin plate exhibited the high heat distortion temperature (HDT) as shown in Table 17.

We claim:

1. A plural liquid pack-type heat-curable polyisocyanate-glycidyl acrylate compound resinous composition comprising:
   (A) a first individual liquid component comprising (a) at least one polyisocyanate compound having at least two isocyanate groups; and
   (B) a second individual liquid component comprising (b) at least one glycidyl acrylate compound having a group of the formula:

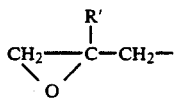

and a group of the formula:

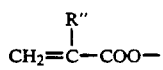

in which formulae, R' and R" respectively and independently represent a member selected from the group consisting of a hydrogen atom and a methyl group, and (B) further comprises at least one member selected from the group consisting of (e) polyol compounds having at least two hydroxyl groups and (f) polyepoxy compounds having at least two epoxy groups; and
   (c) a cyclization catalyst,
   at least one of the first and second individual liquid components (A) and (B) containing (d) a radical catalyst, and wherein he hydroxyl groups of the polyol compound (e) in the second individual liquid component (B) are present in an amount of 5 to 75 equivalents per 100 equivalents of a difference between the amounts in equivalent of isocyanate groups of the polyisocyanate compound (a) in the first individual liquid component (A) and the total epoxy groups of the glycidyl acrylate compound (b) and the polyepoxy compound (f) in the second individual liquid component (B).

2. The resinous composition as claimed in claim 1, wherein the polyol compound (e) in the second individual liquid component (B) is selected from the group consisting of polyetherpolyol compounds, addition products of propylene glycol with ethylene oxide, addition products of a member selected from glycerol, pentaerythritol, sorbitol, trimethylpropanol, bisphenol A, and N-substituted diethanolamine with at least one member selected from ethylene oxide and propylene oxide, polyesterpolyol compounds, polycaprolactonepolyol compounds, polycarbonate polyol compounds, polyetherpolyesterpolyol compounds, polyesterpolyamidepolyol compounds, polyalkylene glycols, hexane diols, glycerol, pentaerythritol, sorbitol, trimethylolpropane, N-mono-aromatic, cycloaliphatic and aliphatic radical-substituted diethanol amines, cyclohexane diols, cyclohexane dimethanols, hydrogenated bisphenol A, and modified polybutadienes, butadiene-styrene copolymers and butadiene-acrylonitrile copolymers each having two or more terminal hydroxyl radicals.

3. The resinous composition as claimed in claim 1, wherein the polyepoxy compound (f) in the second individual liquid component (B) is selected from the group consisting of poly glycidylether compounds, poly glycidylester compounds, poly N-glycidylamino compounds, poly glycidyletherester compounds, cycloaliphatic poly epoxy compounds, and p-amino-phenol triglycidyl compounds.

4. The resinous composition as claimed in claim 1, wherein the isocyanate groups of the polyisocyanate compound (a) in the first individual liquid component (A) are present in an amount of 120 to 1000 equivalents per 100 equivalents of the total epoxy groups of the glycidyl acrylate compound (b) and the polyepoxy compound (f) in the second individual liquid component (B).

* * * * *